United States Patent
Qionghua

(10) Patent No.: US 12,435,784 B2
(45) Date of Patent: Oct. 7, 2025

(54) GEAR MOTOR INCLUDING AN ELECTRIC MOTOR DRIVING A TRANSMISSION

(71) Applicant: SEW-EURODRIVE GMBH & CO. KG, Bruchsal (DE)

(72) Inventor: Gao Qionghua, Tianjin (CN)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 233 days.

(21) Appl. No.: 18/561,361

(22) PCT Filed: Apr. 25, 2022

(86) PCT No.: PCT/EP2022/025175
§ 371 (c)(1),
(2) Date: Nov. 16, 2023

(87) PCT Pub. No.: WO2022/242900
PCT Pub. Date: Nov. 24, 2022

(65) Prior Publication Data
US 2024/0247714 A1 Jul. 25, 2024

(30) Foreign Application Priority Data

May 18, 2021 (CN) .......................... 202110539507.4
Jul. 14, 2021 (DE) .......................... 102021003627.1

(51) Int. Cl.
*H02K 7/08* (2006.01)
*F16H 57/029* (2012.01)
(Continued)

(52) U.S. Cl.
CPC ....... *F16H 57/0471* (2013.01); *F16H 57/029* (2013.01); *F16H 57/031* (2013.01); *F16H 57/0423* (2013.01); *F16H 2057/02034* (2013.01)

(58) Field of Classification Search
CPC .. H02K 5/00; H02K 5/04; H02K 5/12; H02K 5/124; H02K 5/15; H02K 5/16;
(Continued)

(56) References Cited

U.S. PATENT DOCUMENTS 3,817,115 A * 6/1974 Schnizler .............. F16H 57/027
74/417
4,225,144 A 9/1980 Zitz
(Continued)

FOREIGN PATENT DOCUMENTS

| CN | 207111896 U | 3/2018 |
| DE | 30895 A1 | 3/1965 |

(Continued)

OTHER PUBLICATIONS

International Search Report issued in corresponding International Application No. PCT/EP2022/025175 dated Jul. 18, 2022, pp. 1-2, English Translation.
(Continued)

*Primary Examiner* — Tran N Nguyen
(74) *Attorney, Agent, or Firm* — Carter, DeLuca & Farrell LLP

(57) ABSTRACT

A gear motor includes an electric motor adapted to drive a transmission. A bearing flange of the transmission is secured to a housing part of the transmission. A bearing for rotatably mounting the output shaft of the transmission is accommodated in the bearing flange, and a shaft sealing ring is accommodated in the bearing flange, which seals towards the shaft, e.g., performing a sealing function. A cover disc is secured, e.g., using screws, to the bearing flange on the side of the bearing flange facing away from the interior of the transmission, the interior, for example, being filled with lubricating oil. The cover disc has continuous grooves extending in the circumferential direction on its side facing
(Continued)

the bearing flange, and a radial borehole is formed in the cover disc and feeds into one of the grooves, e.g., into the radially outermost groove.

30 Claims, 2 Drawing Sheets

(51) Int. Cl.
*F16H 57/031* (2012.01)
*F16H 57/04* (2010.01)
*F16H 57/02* (2012.01)

(58) Field of Classification Search
CPC .......... H02K 5/161; H02K 5/163; H02K 5/22; H02K 7/08; H02K 7/081; H02K 7/10; H02K 7/116; H02K 11/00; F16H 57/021; F16H 57/023; F16H 57/029; F16H 57/0471; F16H 57/031; F16H 57/0423; F16H 57/0424; F16H 57/0464
See application file for complete search history.

(56) References Cited

U.S. PATENT DOCUMENTS

| | | | |
|---|---|---|---|
| 5,511,448 A * | 4/1996 | Kameda | B60K 17/35 184/11.2 |
| 10,634,232 B2 | 4/2020 | Reineberg | |
| 2015/0377339 A1 * | 12/2015 | Barton | F16C 33/768 384/489 |

FOREIGN PATENT DOCUMENTS

| | | |
|---|---|---|
| DE | 2830191 A1 | 1/1979 |
| EP | 3250844 A1 | 12/2017 |
| WO | 2013146260 A1 | 10/2013 |

OTHER PUBLICATIONS

International Report on Patentability issued in corresponding International Application No. PCT/EP2022/025175, dated Nov. 21, 2023, pp. 1-8, English Translation.

* cited by examiner

GEAR MOTOR INCLUDING AN ELECTRIC MOTOR DRIVING A TRANSMISSION

FIELD OF THE INVENTION

The present invention relates to a gear motor that includes an electric motor adapted to drive a transmission.

BACKGROUND INFORMATION

In certain conventional systems, a gear motor can include an electric motor driving a transmission.

A gear motor is described in PCT Patent Document No. WO 2013/146 260.

A device for sealing the gap between relatively rotating parts is described in German Patent Document No. 28 30 191.

SUMMARY

Example embodiments of the present invention provide for improved operational reliability and service life of a gear motor.

According to example embodiments of the present invention, a gear motor includes an electric motor adapted to drive a transmission, in which a bearing flange of the transmission is secured to a housing part of the transmission, a bearing for rotatably mounting the output shaft of the transmission is accommodated in the bearing flange, a shaft sealing ring is accommodated in the bearing flange, which seals towards the shaft, e.g., performing a sealing function, and a cover disc is secured, e.g., using screws, to the bearing flange on the side of the bearing flange facing away from the interior of the transmission, the interior being, for example, filled with lubricating oil. The cover disc has continuous grooves extending in the circumferential direction on its side facing the bearing flange, and a radial borehole is formed in the cover disc and feeds into one of the grooves, e.g., into the radially outermost groove.

Thus, the operational reliability and service life of the gear motor is increased. This is because grease lubrication together with the cover disc improves the service life of the shaft seal ring on the one hand and prevents the intrusion of dust or dirt on the other, thus increasing operational reliability and service life.

The cover disc is readily manufactured and installed. Additionally, grease filling is carried out via a pipeline and is thus possible from a great distance from the transmission. In this manner, a minimum distance can also be maintained and contact with rotating parts and the associated risk of accidents can be avoided.

According to example embodiments, a pipeline is connected to the cover disc. Thus, no modifications to the transmission are necessary, but rather the cover disc can be attached subsequently and thus the grease lubrication together with the cover disc can be added subsequently to an already existing system.

According to example embodiments, a gap, e.g., an annular gap, is formed between the cover disc and the shaft. Grease overpressure and/or excess grease can be discharged via the gap. This also allows dirt to be pressed out.

According to example embodiments of the present invention, a gear motor includes an electric motor adapted to a transmission, a bearing flange of the transmission is secured to a housing part of the transmission, a bearing for rotatably mounting the output shaft of the transmission is accommodated in the bearing flange, a shaft sealing ring is accommodated in the bearing flange, which seals towards the shaft, e.g., performing a sealing function, and a cover disc is arranged on the bearing flange on the side of the bearing flange facing away from the interior of the transmission, the interior being, for example, filled with lubricating oil, and is rotationally fixed to the shaft. For example, the cover disc is plugged onto the output shaft and is rotationally fixed to the shaft. The cover disc has continuous grooves extending in the circumferential direction on its side facing the bearing flange, and a radial borehole is formed in the cover disc and feeds into one of the grooves, e.g., into the radially outermost groove.

Thus, the operational reliability and service life of the gear motor is increased. This is because grease lubrication together with the cover disc improves the service life of the shaft seal ring on the one hand and prevents the intrusion of dust or dirt on the other, thus increasing operational reliability and service life.

The cover disc is readily manufactured and installed. Additionally, grease filling is carried out via a pipeline leading to the bearing flange and is thus possible from a great distance from the transmission. In this manner, a minimum distance can also be maintained and contact with rotating parts, e.g., also the cover disc, and the associated risk of accidents can be avoided.

For example, a pipeline is connected to the bearing flange. Thus, a compact configuration is achieved, since lubrication through the bearing flange does not require any additional installation space.

For example, the cover disc is tightly connected to the shaft. Thus, a labyrinth seal can be formed between the bearing flange and cover disc.

According to example embodiments, the pipeline feeds into the radial borehole. Thus, the grease can be supplied from a safe position and accident hazards or injuries can be avoided.

According to example embodiments, an end region of the pipeline is secured to a housing part of the electric motor. Thus, grease can be filled in the area of the motor and the pipeline is routed externally to the motor, i.e., not integrated in the motor. In this manner, the function of the motor can be safely guaranteed even if the pipeline is defective.

According to example embodiments, a grease nipple for providing for a supplying of grease is arranged at the end region. Thus, ready supplying is possible.

According to example embodiments, the grooves are arranged and configured coaxially to each other and/or to the axis of rotation of the output shaft. Thus, a labyrinth can be formed by the grooves and the projections projecting axially from the bearing flange.

According to example embodiments, the grooves are configured to be uninterrupted in the circumferential direction and/or to be completely circumferential. Thus, an efficient supplying of grease and a large storage volume can be provided.

According to example embodiments, projections extending in the circumferential direction are formed on the side of the bearing flange facing the cover disc, which projections project into the grooves, e.g., to form a labyrinth seal. Thus, a labyrinth can be readily provided and thus a high tightness and a large storage volume can be provided.

According to example embodiments, the cover disc has a cutout, e.g., a round hole, through which the output shaft projects. Thus, ready assembly is possible.

Further features and aspects of example embodiments of the present invention are explained in more detail below with reference to the appended schematic Figures.

DETAILED DESCRIPTION

Figure 1:
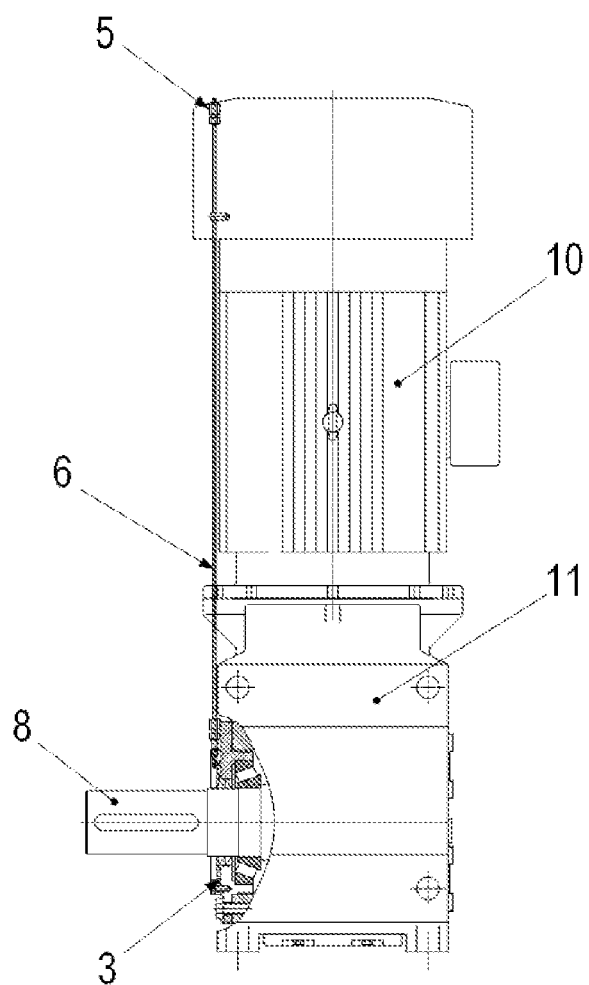
FIG. 1 is a side view of a gear motor according to an example embodiment of the present invention with a truncated output section.
Figure 2:
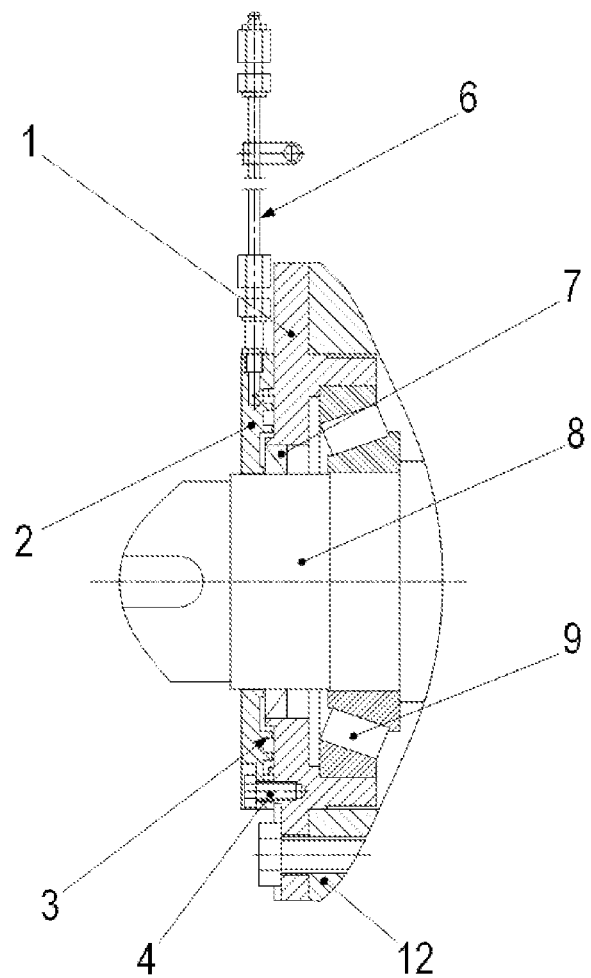
FIG. 2 is an enlarged schematic view of the output section.

As illustrated in the Figures, a transmission 11 is driven by an electric motor 10 and connected thereto.

A bearing flange 1 of the transmission 11 is connected to a housing part 12 of the transmission 11. For example, the bearing flange 1 is secured to the housing part 12, using screws.

A bearing 9 is accommodated in the bearing flange 1 for rotatably mounting the output shaft 8 of the transmission 11.

The output shaft 8 protrudes from the transmission 11.

A shaft seal ring 7 is arranged on the side of the bearing 9 facing away from the interior. The shaft seal ring 7 is accommodated in the bearing flange and seals towards the shaft 8. The seal lip of the shaft seal ring 7, for example, is arranged on a running surface of the shaft 8 finely machined for this purpose.

A cover disc 2 is secured to the bearing flange 1, using screws 4. For this purpose, the screws 4 are screwed into respective axially oriented threaded holes of the bearing flange 1 so that the screw heads of the screws 4 press the cover disc 2 onto the bearing flange 1.

The transmission 11 is, for example, arranged an angular transmission and mounted such that the axis of rotation of the output shaft 8 is aligned parallel to the axial direction. The axis of rotation of the rotor shaft of the electric motor 10 is, for example, aligned vertically.

The output shaft 8 projects through a cutout in the cover disc 2. Only a small gap is provided between the shaft 8 and the cover disc 2, so that there is no contact but also no significant loss of grease.

The side of the cover disc 2 facing the bearing flange 1 has circular grooves arranged coaxially to each other. Each of the grooves is uninterrupted in the circumferential direction with respect to the axis of rotation of the output shaft 8.

Further recesses on the side of the cover disc 2 facing the bearing flange 1 extend in the radial direction and connect the grooves.

A radial borehole of the cover disc 2 feeds into the radially outermost groove.

A pipeline 6, through which grease can be supplied, is connected to the radial borehole from the outside. The grease is filled in at a grease nipple 5 arranged at the end of the pipeline 6 facing away from the bearing flange 1.

This end of the pipeline 6 and/or the grease nipple 5 is or are secured to a housing part of the electric motor 10, e.g., to a fan cover of the electric motor 10.

On the side of the bearing flange 1 facing the cover disc 2, axially projecting projections extending in the circumferential direction are formed on the bearing flange, which projections project into the grooves. Thus, a grease-filled labyrinth seal 3 is formed between the cover disc 2 and the bearing flange 1. However, the cover disc 2 is secured to the bearing flange 1 and thus rotationally fixed.

Thus, by the labyrinth seal between the cover disc 2 and the bearing flange 1, grease lubrication and grease supply to the running area of the seal lip of the shaft seal ring 7 is achieved. Excess grease and/or reduction of excess pressure in the grease is made possible by the gap between the cover disc 2 and the shaft 8. In addition, filling the gap with grease prevents the intrusion of dirt.

According to example embodiments, the screws 4 are not present and the cover disc 2 is rotationally fixed to the shaft 8. Thus, for example, the radial borehole is not arranged in the cover disc 2, but rather in the bearing flange 1 and feeds next to the recesses so that the labyrinth seal can be supplied with grease. The pipeline 6 is connected to the bearing flange 1, e.g., to the radial borehole.

LIST OF REFERENCE NUMERALS

1 Bearing flange
2 Cover disk
3 Labyrinth seal
4 Screw
5 Grease nipple for grease lubrication
6 Pipeline
7 Shaft seal ring
8 Shaft
9 Bearing
10 Electric motor
11 Transmission
12 Housing part

The invention claimed is:

1. A gear motor, comprising:
   a transmission including a bearing flange, a bearing rotatably mounting an output shaft of the transmission accommodated in the bearing flange, a shaft sealing ring accommodated in the bearing flange and sealing toward the output shaft, a cover disk secured to the bearing flange on a side of the bearing flange facing away from an interior of the transmission, and a housing part, the bearing flange being secured to the housing part; and
   an electric motor capable to drive the transmission;
   wherein the cover disk includes continuous grooves extending in a circumferential direction on a side facing the bearing flange, and a radial borehole is formed in the cover disk and capable to feed into one of the grooves.

2. The gear motor according to claim 1, wherein the interior is capable to be filled with lubricating oil.

3. The gear motor according to claim 1, wherein the interior is filled with lubricating oil.

4. The gear motor according to claim 1, wherein the cover disk is secured to the bearing flange by screws.

5. The gear motor according to claim 1, wherein the radial borehole is capable to feed into a radially outermost one of the grooves.

6. The gear motor according to claim 1, wherein a pipeline is connected to the cover disk.

7. The gear motor according to claim 1, wherein a gap is located between the cover disk and the output shaft.

8. The gear motor according to claim 1, wherein an annular gap is located between the cover disk and the output shaft.

9. The gear motor according to claim 6, wherein the pipeline is capable to feed into the radial borehole.

10. The gear motor according to claim 6, wherein an end region of the pipeline is secured to a housing part of the electric motor.

11. The gear motor according to claim 10, wherein a grease nipple capable to supply grease is arranged at the end region.

12. The gear motor according to claim 1, wherein the grooves are arranged coaxially to each other and/or to an axis of rotation of the output shaft.

13. The gear motor according to claim 1, wherein the grooves are uninterrupted in the circumferential direction and/or are completely circumferential.

14. The gear motor according to claim 1, wherein projections extending in the circumferential direction are arranged on a side of the bearing flange facing the cover disk and project into the grooves.

15. The gear motor according to claim 14, wherein the projections form a labyrinth seal.

16. The gear motor according to claim 1, wherein the cover disk has a cutout and/or a round hole, through which the output shaft projects.

17. A gear motor, comprising:
a transmission including a housing part, a bearing flange secured to the housing part, a bearing rotatably mounting an output shaft of the transmission accommodated in the bearing flange, a shaft sealing ring accommodated in the bearing flange and sealing toward the output shaft, a cover disk arranged on the bearing flange on a side of the bearing flange facing away from an interior of the transmission and rotationally fixed to the output shaft; and
an electric motor capable to drive the transmission;
wherein the cover disk includes continuous grooves extending in a circumferential direction on a side facing the bearing flange, and the cover disk includes a radial borehole capable to feed into one of the grooves.

18. The gear motor according to claim 17, wherein the interior of the transmission is capable to be filled with lubricating oil.

19. The gear motor according to claim 17, wherein the interior of the transmission is filled with lubricating oil.

20. The gear motor according to claim 17, wherein the radial borehole is capable to feed into a radially outermost one of the grooves.

21. The gear motor according to claim 17, wherein a pipeline is connected to the bearing flange.

22. The gear motor according to claim 17, wherein the cover disk is tightly connected to the shaft.

23. The gear motor according to claim 21, wherein the pipeline is capable to feed into the radial borehole.

24. The gear motor according to claim 21 wherein an end region of the pipeline is secured to a housing part of the electric motor.

25. The gear motor according to claim 24, wherein a grease nipple capable to supply grease is arranged at the end region.

26. The gear motor according to claim 17, wherein the grooves are arranged coaxially to each other and/or to an axis of rotation of the output shaft.

27. The gear motor according to claim 17, wherein the grooves are uninterrupted in the circumferential direction and/or are completely circumferential.

28. The gear motor according to claim 17, wherein projections extending in the circumferential direction are arranged on a side of the bearing flange facing the cover disk and project into the grooves.

29. The gear motor according to claim 28, wherein the projections form a labyrinth seal.

30. The gear motor according to claim 17, wherein the cover disk has a cutout and/or a round hole, through which the output shaft projects.

\* \* \* \* \*